United States Patent
Cavina

(10) Patent No.: US 9,120,629 B2
(45) Date of Patent: Sep. 1, 2015

(54) SYSTEM AND METHOD FOR WEIGHING CONTAINERS

(71) Applicant: I.M.A INDUSTRIA MACCHINE AUTOMATICHE S.p.A., Ozzano Emilia (Bologna) (IT)

(72) Inventor: Luigi Cavina, Bologna (IT)

(73) Assignee: I.M.A. INDUSTRIA MACCHINE AUTOMATICHE S.p.A., Bologna (IT)

( * ) Notice: Subject to any disclaimer, the term of this patent is extended or adjusted under 35 U.S.C. 154(b) by 0 days.

(21) Appl. No.: 14/344,527

(22) PCT Filed: Sep. 21, 2012

(86) PCT No.: PCT/IB2012/055032
§ 371 (c)(1),
(2) Date: Mar. 12, 2014

(87) PCT Pub. No.: WO2013/046105
PCT Pub. Date: Apr. 4, 2013

(65) Prior Publication Data
US 2014/0353114 A1    Dec. 4, 2014

(30) Foreign Application Priority Data
Sep. 27, 2011   (IT) .............................. BO2011A0551

(51) Int. Cl.
*B65G 29/00* (2006.01)
*G01G 15/00* (2006.01)
*G01G 19/00* (2006.01)
*B65G 47/84* (2006.01)

(52) U.S. Cl.
CPC ................ *B65G 29/00* (2013.01); *G01G 15/00* (2013.01); *G01G 19/00* (2013.01); *B65G 47/846* (2013.01); *B65G 2201/0244* (2013.01); *B65G 2203/0258* (2013.01); *Y10S 198/959* (2013.01)

(58) Field of Classification Search
CPC ................ B65G 29/00; B65G 47/846–47/848; B65G 2201/0244; B65G 2203/0258; G01G 15/00; G01G 19/00; Y10S 198/959
See application file for complete search history.

(56) References Cited

U.S. PATENT DOCUMENTS 3,805,904 A * 4/1974 Zimmerer ........................ 177/54
5,193,630 A * 3/1993 Cane ............................... 177/50

(Continued)

FOREIGN PATENT DOCUMENTS

| WO | WO 96/05485 A1 | 2/1996 | |
|---|---|---|---|
| WO | WO 9605485 A1 * | 2/1996 | ............. G01G 15/00 |
| WO | WO 2010/034388 A1 | 4/2010 | |

*Primary Examiner* — Leslie A Nicholson, III
*Assistant Examiner* — Keith R Campbell
(74) *Attorney, Agent, or Firm* — R. Neil Sudol; Henry D. Coleman

(57) ABSTRACT

A system for weighing containers includes a movable member having a peripheral edge in which a recess forms a seat for drawing a container, the movable member being activatable in a first movement direction such that a first wall of the seat abuts and draws the container; a container-weighing cell comprising a support plane for receiving and supporting the container; a container guide. The weighing cell, the movable member and the guide are reciprocally arranged such that when the container is drawn by the movable member the container can slide on the support plane and be guided by guide externally of the seat. The movable member is further activatable in a second, opposed, movement direction to detach the seat from the container and leave the container on the support plane for weighing.

9 Claims, 4 Drawing Sheets

(56) References Cited

U.S. PATENT DOCUMENTS

| | | | |
|---|---|---|---|
| 5,236,337 A * | 8/1993 | Kikuchi et al. | 177/52 |
| 5,740,843 A * | 4/1998 | Burkart | 141/79 |
| 5,929,387 A * | 7/1999 | Inglin | 177/119 |
| 8,178,798 B2 * | 5/2012 | Edrich et al. | 177/145 |
| 8,247,711 B2 * | 8/2012 | Troisi et al. | 177/145 |
| 8,455,773 B2 * | 6/2013 | Trebbi et al. | 177/145 |
| 2008/0115979 A1 * | 5/2008 | Shipp et al. | 177/52 |
| 2010/0314177 A1 | 12/2010 | Troisi et al. | |
| 2014/0238820 A1 * | 8/2014 | Cavina | 198/346.2 |

* cited by examiner

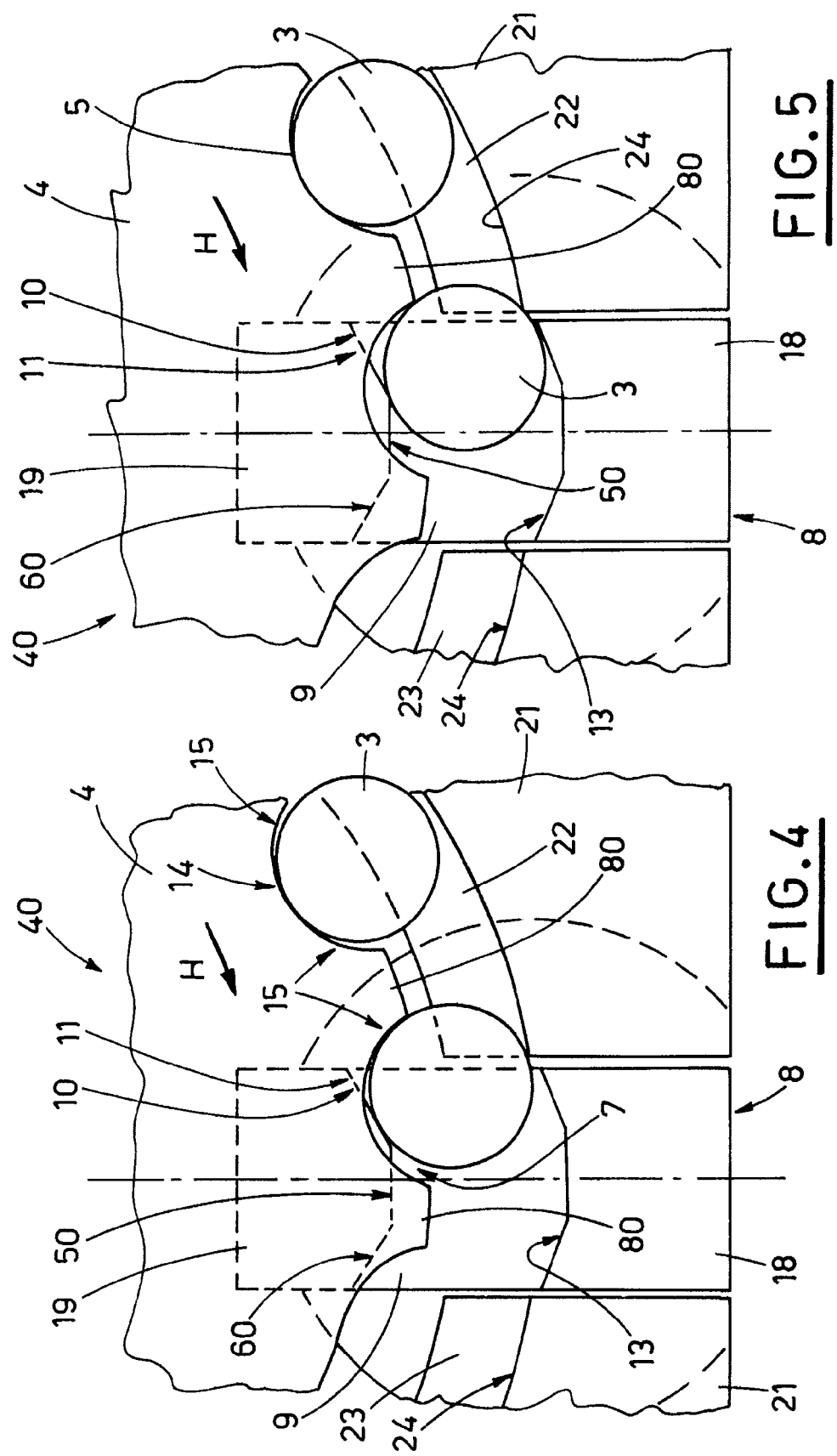

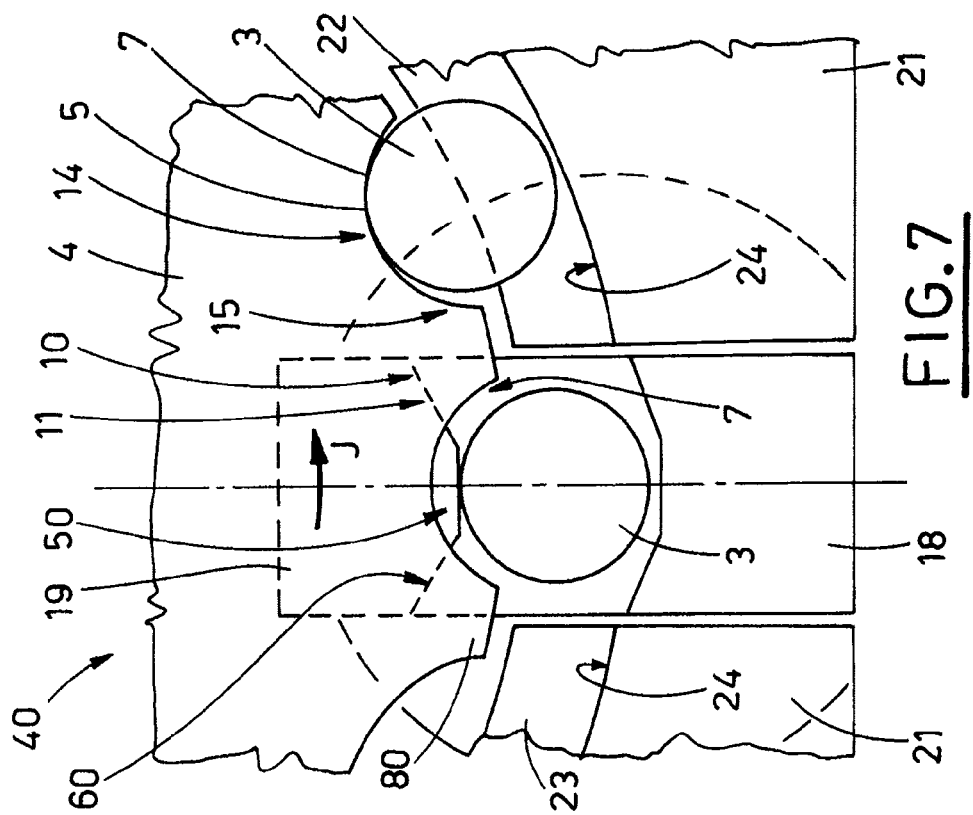
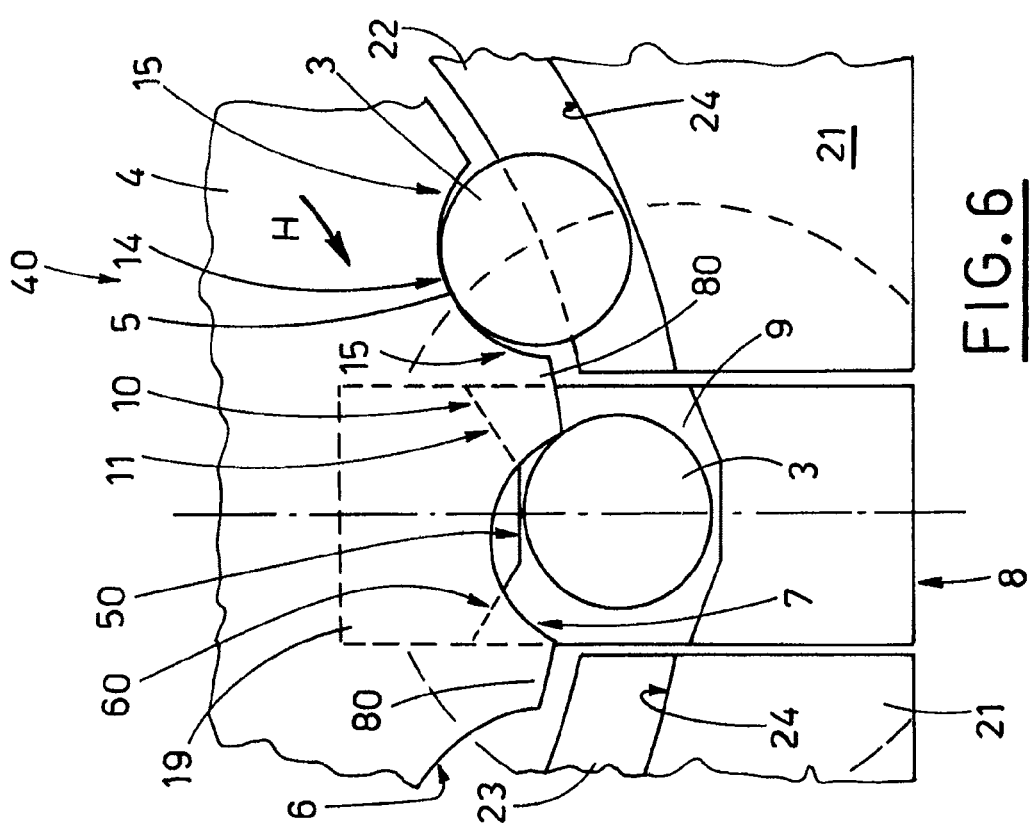

SYSTEM AND METHOD FOR WEIGHING CONTAINERS

FIELD OF THE INVENTION

The present invention relates to a system for weighing containers, such as flagons, vials or bottles, as well as to a method for weighing containers, carried out by the system.

DESCRIPTION OF THE PRIOR ART

Weighing stations are known for containers, which can be an integral part of the container filling and sealing production lines. In the present example the containers are weighed before and after filling thereof, so that it is possible to control the quantity of product that has been introduced therein.

Weighing the containers can be done on a predetermined percentage of the total of the containers; in this case, the term used in "statistical weighing".

Weighing stations are arranged by a side of the container conveyor line that is a part of the production line, and comprise: a rotating disc for drawing the container, arranged by a side of the conveyor line, which rotating disc is provided at a peripheral edge thereof with a plurality of recesses which form seatings for receiving the containers; switching means of the container to be weighed from the conveyor line onto the rotating disc and for deviating the weighed containers from the rotating disc to the conveyor line; weighing means cooperating with the rotating disc such as to weigh the containers drawn by the rotating disc.

The weighing means face a tract of the peripheral edge of the rotating disc, and comprise a weighing cell which is distanced from the circular trajectory described by the containers when they are drawn by the rotating disc; the weighing means further comprise gripping and transferring means for picking up a container to be weighed from the corresponding seating of the rotating disc and bringing it onto the weighing cell, as well as for picking up a weighed container arranged on the weighing cell and bringing it into the appropriate seating on the rotating disc.

For the purposes of the weighing operations, the rotating disc is step-activated; in fact, the rotating disc must stay still for the time required for carrying out: transfer of the container from the seating to the weighing cell, the weighing of the container and the transfer of the weighed container from the weighing cell to the seating.

In order to weigh each container, therefore, a long time is required if compared with the velocity at which the containers are conveyed onto the conveyor line; further, in order to weigh a plurality of containers collected from the conveyor line, a longer time is required, proportional to the time for weighing a single container.

The time required for weighing a plurality of containers must not exceed a certain limit; in fact, statistical weighing requires that a first batch of weighed containers is newly placed onto the conveyor line before a second batch of containers to be weighed, which follows the first batch of containers, is collected from the conveyor line in order to be weighed.

Therefore, in accordance with the velocity with which the containers on the conveyor line are moved in order to maintain a certain productivity, a limitation can arise with regard to the maximum number of containers to be weighed and being part of a same batch of containers.

SUMMARY OF THE INVENTION

The aim of the present invention consists in obviating the above-described drawback.

The above aim is attained with a system for weighing containers and a method carried out by the system as described herein.

The container weighing group or system comprises:
a movable member for drawing at least one container, the movable member featuring a peripheral edge wherein a recess forming a seat for drawing the container is achieved, the movable member being movable in a first movement direction so as a first wall of the seat abuts and draws the container; a weighing cell for weighing said container, including a support plane for receiving and supporting the container; characterised in that: the group includes guide means for guiding the container; the weighing cell, the movable member and the guide means are arranged in such a way that when the container is drawn by the movable member the container can slide on the support plane and being guided by the guide means outwards with respect to the seat; the movable member is further movable in a further second movement direction, opposite to the first movement direction, for detaching the seat from the container and leaving the container on the support plane for weighing.

A method for weighing containers, carried out by the above-cited system, comprises following steps:
engaging at least one container to be weighed in a seat of a movable member, the movable member featuring a peripheral edge wherein a recess forming said seat is achieved; activating the movable member in a first movement direction (H), in such a way that a first wall of the seat abuts and slidingly draws the container on a support plane of a weighing cell and that the container is guided by guide means outwards with respect to the seat; driving the movable member in a second movement direction, opposite to the first movement direction, for detaching the seat from the container and leaving the container on the support plane to be weighed.

The support plane of the weighing cell lies on a tract of the path described by the container when it is drawn by the movable member: thus, the movable member can slidingly draw the container on the rest plane.

When the container slides on the rest plane, it is guided by the guide means distancingly from the corresponding seating accommodating it.

A subsequent counter-motion of the movable member in a second activating direction, opposite the first activating direction, enables realising a total detachment of the seat of the movable member from the container, while guaranteeing that the container remains on the rest plane for weighing.

In this way the container no longer contacts the movable member and can therefore be weighed correctly.

It is advantageously no longer necessary to include gripping and transfer means, as in the prior art; with the invention, the container can slide directly on the support plane of the weighing cell, such that it no longer contacts the seating which previously received it, enabling a correct weighing of the container.

Further, the times required for weighing the container are significantly reduced with respect to the prior art.

The guide means preferably comprise a lateral guide wall.

The lateral guide wall preferably originates from the rest plane.

The movable member can be an element forming a comb, activatable with a step-motion; the movable member is preferably a rotating disc activatable in step-fashion or continuously.

BRIEF DESCRIPTION OF THE DRAWINGS

Specific embodiments of the invention will be described in the following of the present description, according to what is set out in the claims and with the aid of the accompanying tables of drawings, in which:

FIGS. 2, 4, 5, 6, 7 schematically illustrate, in larger scale, a detail of FIG. 1, showing further steps of the method actuated by the system, according to the invention;

DESCRIPTION OF PREFERRED EMBODIMENTS

Figure 1:
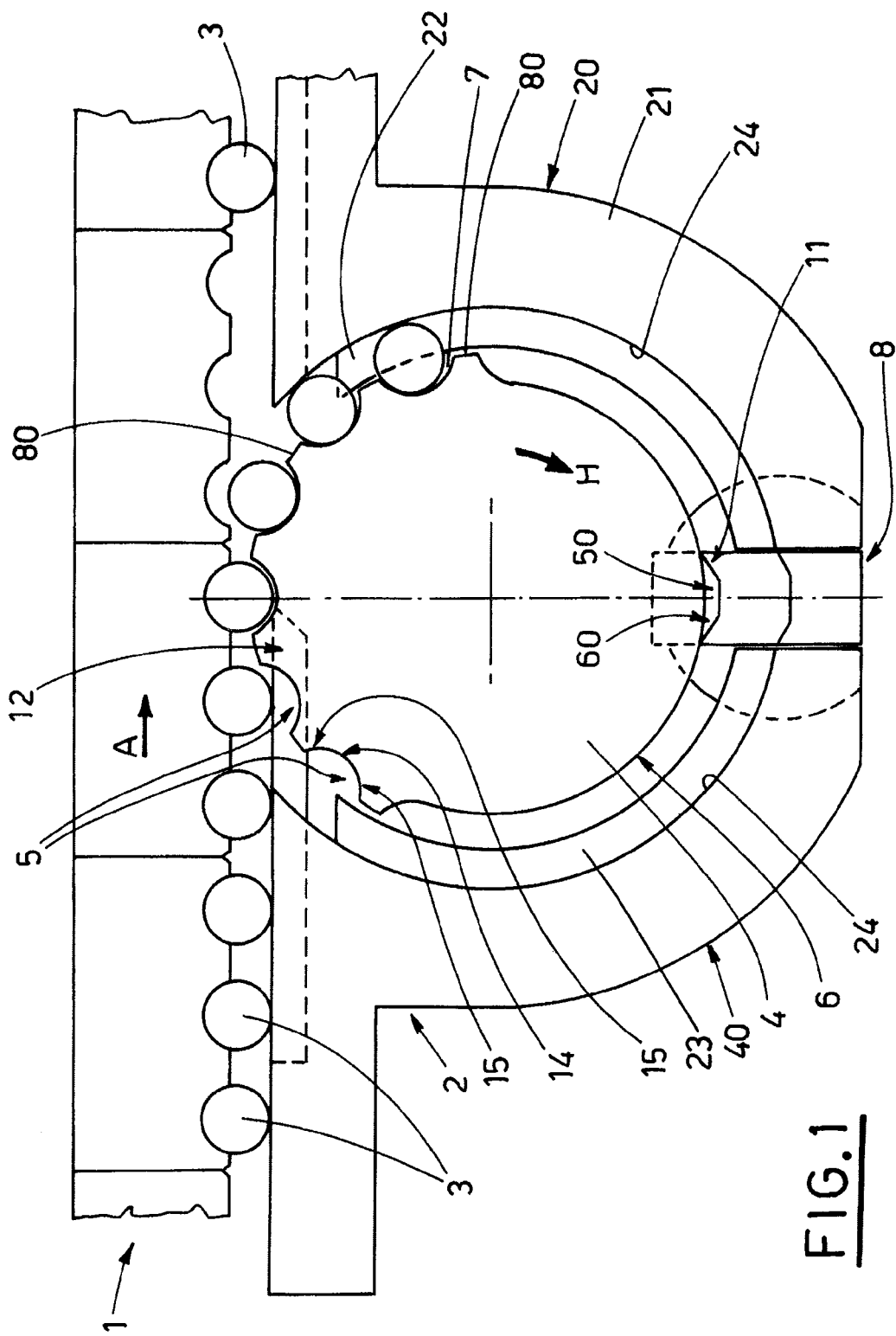
FIG. 1 is a schematic view from above of a tract of a conveyor line of containers and a weighing station of containers arranged by a side of the conveyor line, which weighing station comprises a system for weighing containers according to the present invention.

With specific reference to FIG. 1, reference numeral 1 denotes a conveyor line for containers, such as vials, flagons or bottles, and 2 denotes a weighing station arranged flanked to a tract of the conveyor line 1.

The conveyor line 1 and the weighing station 2 are part, for example, of a production line for filling and sealing containers.

The conveyor line 1 moves a plurality of containers 3 along a supply direction, in an advancing direction A; the weighing station 2 is activated in phase relation with the conveyor line 1 such as to collect a certain number of containers 3 to be weighed by the conveyor line 1 and for newly placing the containers 3 on the conveyor line 1 once they have been weighed.

By way of example, FIG. 1 illustrates a step in which some containers 3 are collected from the conveyor line 1 for the purpose of undergoing weighing operations.

With reference to the accompanying tables of drawings, and therefore to FIGS. 1-7, the container weighing group, apparatus or system, denoted by 40, comprises:

a movable member 4 for drawing at least one container 3, the movable member 4 featuring a peripheral edge wherein a recess 5 forming a seat 7 for drawing the container 3 is achieved, the movable member 4 being movable in a first movement direction H so as a first wall 15 of the seat 7 abuts and draws the container 3; a weighing cell 8 for weighing said container 3, including a support plane 9 for receiving and supporting the container 3; guide means 10 for guiding the container 3. The weighing cell 8, the movable member 4 and the guide means 10 are arranged in such a way that when the container 3 is drawn by the movable member 4 the container 3 can slide on the support plane 9 and being guided by the guide means 19 outwards with respect to the seat 7; the movable member 4 is further movable in a further second movement direction J, opposite the first movement direction H, for detaching the seat 7 from the container 3 and leave the container 3 on the support plane 9 for weighing.

The method for weighing containers 3, which can be carried out by the above-described system or apparatus 40 and also forming an object of the present invention, comprises following steps:

engaging at least one container 3 to be weighed in a seat 7 of a movable member 4, the movable member 4 featuring a peripheral edge 6 wherein a recess 5 forming said seat 7 is afforded, driving the movable member 4 in a first movement direction H, in such a way that a first wall 15 of the seat 7 abuts and slidingly draws the container 3 on a support plane 9 of a weighing cell 8 and that the container 3 is guided by guide means 10 outwards with respect to the seat 7;

driving the movable member 4 in a second movement direction J, opposite the first movement direction H, such as to detach the seat 7 from the container 3 and leave the container 3 on the support plane to be weighed.

The support plane 9 of the weighing cell 8 lies on a tract of the path followed by the container 3 when the container 3 is drawn by the movable member 4: thus, the movable member 4 can draw the container 3 slidingly on the support plane 9.

When the container 3 slides on the support plane 9, it is guided by the guide means 10 distancingly from the corresponding seat 7 receiving it.

A subsequent counter-movement of the movable member 4 in the second movement direction J, opposite the first movement direction H, enables realising a complete detachment of the seat 7 of the movable member 4 from the container 3, while guaranteeing that the container 3 remains on the support plane 9 for weighing.

In this way the container 3 no longer contacts the movable member 4 and can therefore be weighed correctly.

The seat 7 includes two lateral walls 15 that are opposite one another and an internal wall 14 connected to the two lateral walls 15; the first wall is defined by one of the two lateral walls 15. When the container 3 is guided by the guide means 10 outwards with respect to the seat 7, the container moves away from the internal wall 14.

The guide means 10 preferably comprise a lateral guide wall 11 which is a part of the weighing cell 8.

The lateral guide wall 11 preferably emerges from the support plane 9.

The lateral guide wall 11 is preferably perpendicular to the support plane 9.

The weighing cell 8 preferably comprises an auxiliary abutting wall 13 for abutting the container 3, which auxiliary abutting wall 13 faces the lateral guide wall 11.

Each seat 7 preferably has an arched shape: an internal wall 14 and two lateral walls 15 can still be identified.

Still more preferably, each seat 7 has a semi-elliptical shape, as illustrated in the drawings. An internal wall 14 and two lateral walls 15 can still be identified. In the illustrated example, the movable member 4 is provided with a cogged sector and each seat 7 is conformed by the base compartment between two adjacent cogs 80; in this case, the lateral walls 15 are defined by the flanks to the cogs 80.

The weighing cell 8 is preferably positionable with respect to the movable member 4 in such a way that the support plane 9 and the lateral guide wall 11 are below the seat 7 of the movable member 4 (see FIG. 3), with the lateral guide wall 11 projecting externally with respect to the internal wall 14 of the seating 7 during the transfer of the container 3 onto the support plane 9 (FIGS. 4, 5).

The movable member 4 is preferably a rotating disc 4, as illustrated in the appended tables of drawings; in this case the first movement direction corresponds to a first rotation direction H and the second movement direction corresponds to a second rotation direction J opposite the first rotation direction H.

In the example illustrated in the figures, the rotating disc 4 is provided with six seats for receiving six containers 3. A batch of containers 3 to be weighed is therefore composed, in the illustrated case, of six containers 3.

The weighing station 2 comprises weighing means which in turn comprise the weighing cell 8; the weighing means 8 comprise a weighing scales, not illustrated.

The weighing station 2 further comprises switching means 12 for switching the containers 3 to be weighed from the conveyor line 1 onto the rotating disc 4 and for switching the weighed containers 3 from the rotating disc 4 to the conveyor line 1; the switching means 12 are of known type. The switching means 12 comprise aspirating means; the aspirating means, in turn, comprise aspirating channels 16 which open for example at the internal wall 14 of each seat 7 of the rotating disc 4.

Figure 3:
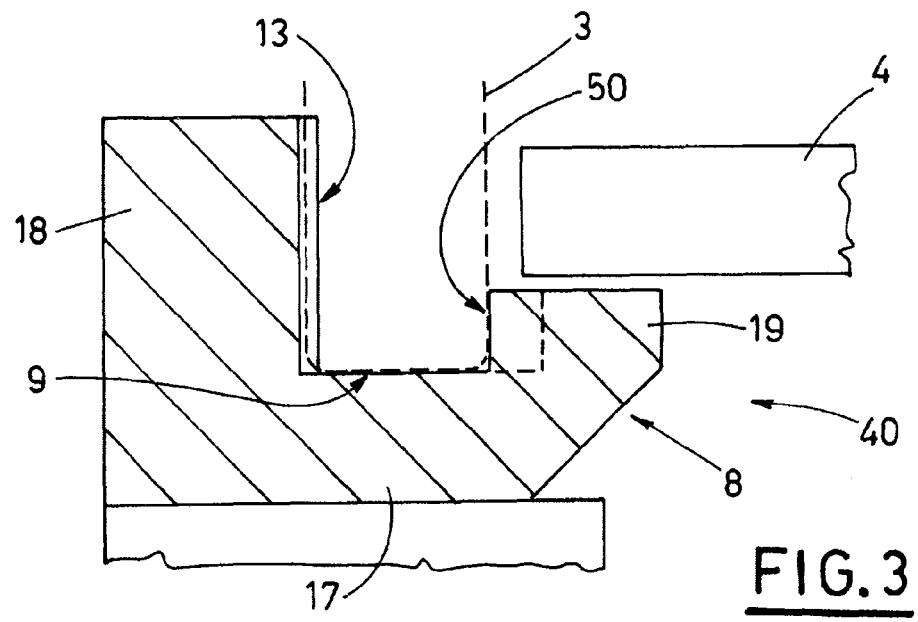
FIG. 3 is the view of section of FIG. 2.

The weighing cell 8 faces a tract of the peripheral edge 6 of the rotating disc 4. in the example illustrated in FIG. 3, the weighing cell 8 has a U-shape, comprising a base 17 from which a first side 18 and a second side 19 originate; the first side 18 is in the form of a first member which forms the auxiliary abutting wall 13, while the second side 19 takes the shape of a second member which is lower than the first member and forms the lateral guide wall 11.

The rotating disc 4 is arranged higher than the second member 19 of the weighing cell 8, such that each seat 7 of the rotating disc 4 can superpose the lateral guide wall 11, see FIGS. 4-7.

The base 17 of the weighing cell 8 is provided with the support plane 9.

The weighing station 2 has a frame 20 which comprises a portion 21 that partially surrounds the rotating disc 4. This portion 21 of the frame 20 is provided with a first support 22 and a second support 23 arranged with respect to the rotating disc 4 in such a way that the containers 3 of a batch of containers 3 can slide thereon once they have been switched by the conveyor line 1 onto the rotating disc 4. Further, the portion 21 of frame 20 is also provided with lateral guide walls 24 adjacent to the first support 22 and the second support 23, having the function of guiding the containers 3 to be weighed and the weighed containers 3 along a circular pathway in cooperation with the rotating disc 4.

The first support 22 has an arched shape, faces the rotating disc and is arranged such as to supportingly receive the containers 3 switched from the conveyor line 1 and drawn by the rotating disc towards the weighing cell 8; the second support 23 has an arched shape, faces the rotating disc 4 and is arranged such as to supportingly receive the containers 3 weighed in outlet from the weighing cell 8 and drawn by the rotating disc 4 towards the conveyor line 1.

In other words, with respect to the path the containers 3 follow when they are to be weighed, the first support 22 is arranged upstream of the weighing cell 8 while the second support 23 is arranged downstream of the weighing cell 8.

The first support 22, the support plane 9 of the weighing cell 8 and the second support 23 form a track on which the containers 3 to be weighed and the weighed containers 3 can slide, moved by the rotating disc 4.

The support surface of the first support 22 and the second support 23, which are predisposed to contact the bottom of the containers 3, are coplanar with the support plane 9 of the weighing cell 8, such that a container 3 drawn by the rotating disc 4 can slide continuously respectively along the first support 22, the support plane 9 and the second support 23.

Figure 2:
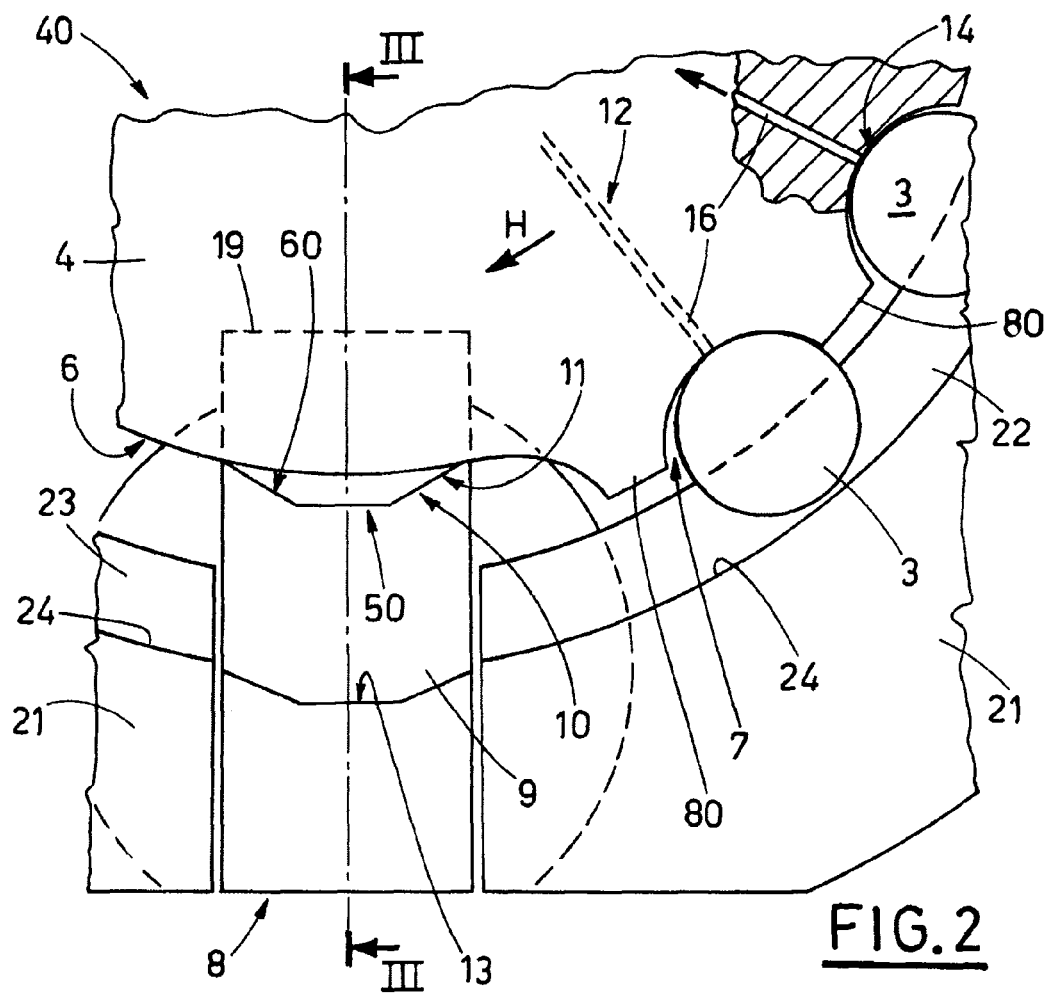

FIG. 2 and from 4 to 7 illustrate successive steps of the method actuated by the weighing system or apparatus 40 according to the invention.

The containers 3 of a batch of containers 3 are switched from the conveyor line 1 to the rotating disc 4 by the switching means 12, see FIG. 1. For this operation, the aspirating means are activated in phase relation with the rotation of the rotating disc 4 and the advancing of the containers 3 along the conveyor line 1.

The containers 3 to be weighed and switched onto the rotating disc 4 adhere initially to the internal wall 14 of the seats 7 to which they are engaged due to the aspirating action exerted through the aspirating channels 16.

Thereafter, after a successive rotation of the rotating disc 4, the containers 3 to be weighed slide on the first support 22 and the aspirating means are deactivated (see FIG. 2); as a consequence, one of the lateral walls 15 abuts the corresponding container 3 and draws it. Thus the container 3 is abutted by a lateral wall 15 of the seating 7, which draws it, and at the same time slides on the first support 22; the lateral guide walls 24 of the portion 21 of frame 20 cooperate with the rotating disc 4 to send the container 3 along a circular path and guarantee that the container 3 remains engaged in the corresponding seat 7.

After a further rotation of the rotating disc 4, the container 3 which slides on the first support 22 is transferred onto the rest plane 9 and contacts the lateral guide wall 11 of the weighing cell 8, see FIG. 4. As the rotating disc 4 rotates, the container 3 is progressively distanced from the seat 7 by the lateral guide wall 11, see FIGS. 5, 6; in general it can be said that the container 3 detaches from the internal wall 14 and remains in contact only with the lateral wall 15 moving it.

In the example illustrated in the figures, the second member 19 of the weighing cell 8 is further provided: with a first lateral abutting wall (50) which is connected to the lateral guide wall 11 and is arranged at an angle with respect to the lateral guide wall 11; and a second lateral abutting wall 60 which is connected to the first lateral abutting wall 50 and is arranged at an angle with respect thereto.

In general, the lateral guide wall 11 can have a different angulation and/or arrangement with respect to the first lateral abutting wall 50, while still performing the guide function described above.

Finally, a counter-movement of the rotating disc 4 in the second rotating direction J has the aim of detaching the seat 7 from the container 3, see FIG. 7; the container 3 is supported on the support plane 9 of the weighing cell 8 and no longer contacts the seating 7 that received it, so that it can be weighed with a high degree of precision.

Thereafter the rotating disc 4 is newly activated to remove the container 3 that has just been weighed and to weigh a successive container 3 which follows the container 3 that has been weighed, until all the containers 3 of the batch have been weighed. Then the weighed containers 3 are replaced on the conveyor line 1, by action of the switching means 12.

Alternatively, in a variant that is not illustrated, the first support 22 and the second support 23 can be in a single body with the weighing cell 8, so that a sole support plane 9 (not illustrated in the figures) of weighing cell 8 can be defined, being larger than the one illustrated in the appended figures; in this case, and by way of example, the aspirating channel of a seat 7 is deactivated only when the container 3 held in the seat 7 is sliding on the support plane 9.

The foregoing has been described by way of non-limiting example, and any constructional variants are understood to fall within the scope of protection of the present technical solution, as claimed in the following.

The invention claimed is:

1. A system for weighing containers including:
   a movable member for drawing at least one container, the movable member featuring a peripheral edge wherein a recess forming a seat for drawing the container is achieved, the movable member being movable in a first movement direction so as a first wall of the seat abuts and draws the container;
   a weighing cell for weighing said container, including a support plane for receiving and supporting the container; wherein:
   the system includes guide means for guiding the container;
   the weighing cell, the movable member and the guide means are arranged in such a way that when the container is drawn by the movable member the container can slide on the support plane and being guided by the guide means outwards with respect to the seat;

the movable member is further movable in a further second movement direction, opposite to the first movement direction, for detaching the seat from the container and leave the container on the support plane for weighing; and the guide means includes a lateral guide wall being part of the weighing cell.

2. The system according to the claim 1, wherein the seat includes two lateral walls that are opposite one another and an internal wall connected to the two lateral walls, said first wall being defined by one of the two lateral walls, and wherein, when the container is guided by the guide means outwards with respect to the seat, the container moves away from the internal wall.

3. The system according to claim 1, wherein the weighing cell is positionable with respect to the movable member in such a way that the support plane and the lateral guide wall be below the seat of the movable member, with the lateral guide wall projecting outwards with respect to the internal wall of the seat.

4. The system according to claim 1, wherein the lateral guide wall is perpendicular to the support plane.

5. The system according to claim 1, wherein the lateral guide wall originates from the support plane.

6. A system for weighing containers including:

a movable member for drawing at least one container, the movable member featuring a peripheral edge wherein a recess forming a seat for drawing the container is achieved, the movable member being movable in a first movement direction so as a first wall of the seat abuts and draws the container;

a weighing cell for weighing said container, including a support plane for receiving and supporting the container; wherein:

the system includes guide means for guiding the container;

the weighing cell, the movable member and the guide means are arranged in such a way that when the container is drawn by the movable member the container can slide on the support plane and being guided by the guide means outwards with respect to the seat;

the movable member is further movable in a further second movement direction, opposite to the first movement direction, for detaching the seat from the container and leave the container on the support plane for weighing; and the movable member is a rotating disk.

7. The system according to claim 1, wherein the weighing cell includes an auxiliary abutting wall for abutting the container, said auxiliary abutting wall being opposite the lateral guide wall.

8. The system according to claim 1, wherein the seat is arch-shaped.

9. The system according to claim 8, wherein the seat is semi-ellipse-shaped.

* * * * *